US012811679B2

(12) United States Patent
MacKay et al.

(10) Patent No.: US 12,811,679 B2
(45) Date of Patent: Nov. 24, 2026

(54) QUANTIFYING AND VISUALIZING SYSTEM IMPAIRMENTS IN AN OPTICAL NETWORK

(71) Applicant: Ciena Corporation, Hanover, MD (US)

(72) Inventors: Alex W. MacKay, Ottawa (CA); Blair E. P. Moxon, Ottawa (CA); Erik McLaughlin, Ottawa (CA); Christiane L. Campbell, Ottawa (CA)

(73) Assignee: Ciena Corporation, Fulton, MD (US)

( * ) Notice: Subject to any disclaimer, the term of this patent is extended or adjusted under 35 U.S.C. 154(b) by 225 days.

(21) Appl. No.: 18/754,736

(22) Filed: Jun. 26, 2024

(65) Prior Publication Data

US 2026/0005762 A1 Jan. 1, 2026

(51) Int. Cl.

| | |
|---|---|
| ***H04B 10/08*** | (2006.01) |
| ***H04B 10/073*** | (2013.01) |
| ***H04B 10/077*** | (2013.01) |

(52) U.S. Cl.

CPC ..... *H04B 10/0775* (2013.01); *H04B 10/0731* (2013.01); *H04B 10/0773* (2013.01)

(58) Field of Classification Search

CPC .......... H04B 10/0795; H04B 10/07953; H04B 10/07955; H04B 10/0775; H04B 10/0731; H04B 10/0773; H04B 10/038; H04J 14/02; H04J 14/0212; H04Q 11/0062; H04Q 11/0067; H04Q 11/0066; H04Q 11/0005

USPC ... 398/79, 83, 202, 208, 209, 135, 136, 158, 398/159, 33, 38, 25, 26, 27, 45, 48, 49, 2, 398/3, 4, 5, 7, 8

See application file for complete search history.

(56) References Cited

U.S. PATENT DOCUMENTS

| | | | |
|---|---|---|---|
| 6,941,359 | B1 | 9/2005 | Beaudoin et al. |
| 7,107,496 | B1 | 9/2006 | D'Ippolito et al. |
| 7,149,975 | B1 | 12/2006 | Johnson et al. |
| 8,467,678 | B2 | 6/2013 | Jenkins et al. |
| 9,767,179 | B2 | 9/2017 | Grignon et al. |
| 9,806,803 | B2 | 10/2017 | Bownass et al. |
| 10,282,905 | B2 | 5/2019 | Moxon et al. |
| 10,361,957 | B1 | 7/2019 | Mackay et al. |

(Continued)

OTHER PUBLICATIONS

Jul. 29, 2025, International Search Report and Written Opinion for International Patent Application No. PCT/US2025/030159.

*Primary Examiner* — Hanh Phan
(74) *Attorney, Agent, or Firm* — Baratta Law PLLC; Lawrence A. Baratta, Jr.

(57) ABSTRACT

Quantifying and visualizing system impairments in an optical network includes, subsequent to determining baseline noise impairment values for a plurality of segments in an end-to-end path for a photonic service, determining current noise impairment values for the plurality of segments, wherein the baseline noise impairment values and the current noise impairment values relate to Signal-to-Noise Ratio (SNR) margin for the photonic service; and displaying a visualization of the end-to-end path for the photonic service, at a level of each segment of the plurality of segments, wherein the visualization includes a delta between the baseline noise impairment values and the current impairment noise values and associated impact on overall noise values for the photonic service. The quantifying and visualizing system can include receiving a selection of a segment in the visualization and displaying a health tile visualization illustrating one or more components in the segment.

20 Claims, 14 Drawing Sheets

(56) References Cited

U.S. PATENT DOCUMENTS

| | | | |
|---|---|---|---|
| 11,496,817 | B2 | 11/2022 | Mackay et al. |
| 11,507,262 | B2 | 11/2022 | Campbell et al. |
| 11,533,216 | B2 | 12/2022 | D'Ippolito et al. |
| 11,563,486 | B2 | 1/2023 | Swinkels et al. |
| 11,811,459 | B1 | 11/2023 | Pei et al. |
| 11,855,851 | B2 | 12/2023 | Shiner et al. |
| 11,894,987 | B2 | 2/2024 | Campbell et al. |
| 11,929,881 | B2 | 3/2024 | Sinclair et al. |
| 11,967,986 | B2 | 4/2024 | Mehta et al. |
| 2018/0359029 | A1 | 12/2018 | Shiner et al. |
| 2022/0007093 | A1* | 1/2022 | MacKay .............. H04B 10/038 |
| 2022/0376997 | A1 | 11/2022 | Sinclair et al. |
| 2023/0146640 | A1* | 5/2023 | MacKay .......... H04B 10/07953 398/5 |
| 2023/0224224 | A1 | 7/2023 | Stoll et al. |
| 2024/0031022 | A1 | 1/2024 | Pei et al. |
| 2024/0031023 | A1 | 1/2024 | MacKay et al. |

* cited by examiner

200

220

220

300

300

300

360

QUANTIFYING AND VISUALIZING SYSTEM IMPAIRMENTS IN AN OPTICAL NETWORK

FIELD OF THE DISCLOSURE

The present disclosure relates generally to optical networking. More particularly, the present disclosure relates to systems and methods for quantifying and visualizing system impairments in an optical network.

BACKGROUND OF THE DISCLOSURE

An optical network uses multiple wavelengths (or channels) of light to transmit data over various optical fiber paths. Key components include wavelength division multiplexing (WDM) multiplexers and demultiplexers, which combine and separate the wavelengths, respectively; optical amplifiers, such as erbium-doped fiber amplifiers (EDFAs), which boost signal strength; and wavelength selective switches (WSS), which spectrally shape and route specific wavelengths to different paths. Of course, there can be other components and each component introduces some noise impairment to an optical channel. Managing the signal-to-noise ratio (SNR) in such a network involves ensuring that the signal power is sufficiently high while minimizing noise contributions from sources like amplified spontaneous emission (ASE) in amplifiers and nonlinear effects in the fiber. This can be achieved by optimizing amplifier spacing, amplifier settings, using high-quality components, implementing proper dispersion management, and carefully planning the power levels and wavelengths used to minimize interference and crosstalk between channels. Network operators must manually inspect all parts of an optical service path, i.e., components, identify the appropriate tools to assess performance, and establish a baseline for comparison. Only then can they understand how each component affects the overall performance of the optical service.

BRIEF SUMMARY OF THE DISCLOSURE

The present disclosure relates to systems and methods for quantifying and visualizing system impairments in an optical network. The present disclosure includes a tool, process, visualization, and workflows that can be integrated with a network management system or the like to enable an operator to visualize and quantify how different parts of the network are imparting SNR impairments on particular services. In particular, the present disclosure:

(1) explicitly relates end-to-end optical service performance expressed in SNR margin to individual components such as modems, multiplexers and demultiplexers, optical multiplex sections (OMSs), and the sub-components that make up an OMS (e.g. amplifier equipment, spans, etc.).

(2) quantifies the SNR Margin delta (negative or positive in dB) of changes that have occurred in each piece of infrastructure in the service path, relative to pre-established baselines.

(3) presents the breakdown to an operator in a single pane of glass for troubleshooting the correct infrastructure causing the change in SNR. As is known in the art, a "single pane of glass" in a graphical user interface (GUI) is a unified interface that consolidates data and controls from multiple systems into a single, centralized dashboard for streamlined monitoring and management.

(4) associates specific causes of the delta to SNR Margin per infrastructure for next-step troubleshooting.

This type of functionality reinforces management system capabilities to help operators troubleshoot and manipulate the optical network with a high degree of confidence.

In various embodiments, the present disclosure includes a method having steps, an apparatus with one or more processors configured to implement the steps, a processing device configured to implement the steps, a management system configured to implement the steps, and a non-transitory computer-readable medium storing instructions that, when executed, cause one or more processors to implement the steps. The steps include subsequent to determining baseline noise impairment values for a plurality of segments in an end-to-end path for a photonic service, determining current noise impairment values for the plurality of segments, wherein the baseline noise impairment values and the current noise impairment values relate to Signal-to-Noise Ratio (SNR) margin for the photonic service; and displaying a visualization of the end-to-end path for the photonic service, at a level of each segment of the plurality of segments, wherein the visualization includes a delta between the baseline noise impairment values and the current noise impairment values and associated impact on overall noise impairment values for the photonic service.

The steps can further include receiving a selection of a segment in the visualization and displaying a health tile visualization illustrating one or more components in the segment. The health tile visualization includes the one or more components, their noise impairment contribution, their location, and one or more tools for troubleshooting. The one or more components can include any of a modem transmitter, a multiplexer, optical amplifiers, a demultiplexer, modem receiver, and fiber. The one or more components can include fiber and an associated loss measurement for each of the baseline noise values and the current noise values.

The baseline noise impairment values are determined at a previous point in time from the current noise values where the photonic service was operating properly. The baseline noise impairment values can be determined based on a simulation or calculation. The plurality of segments can include a modem transmitter, a multiplexer, at least one Optical Multiplex Section, a demultiplexer, and a modem receiver.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Again, the present disclosure relates to systems and methods for quantifying and visualizing system impairments in an optical network.

Example Optical Network

Figure 1:
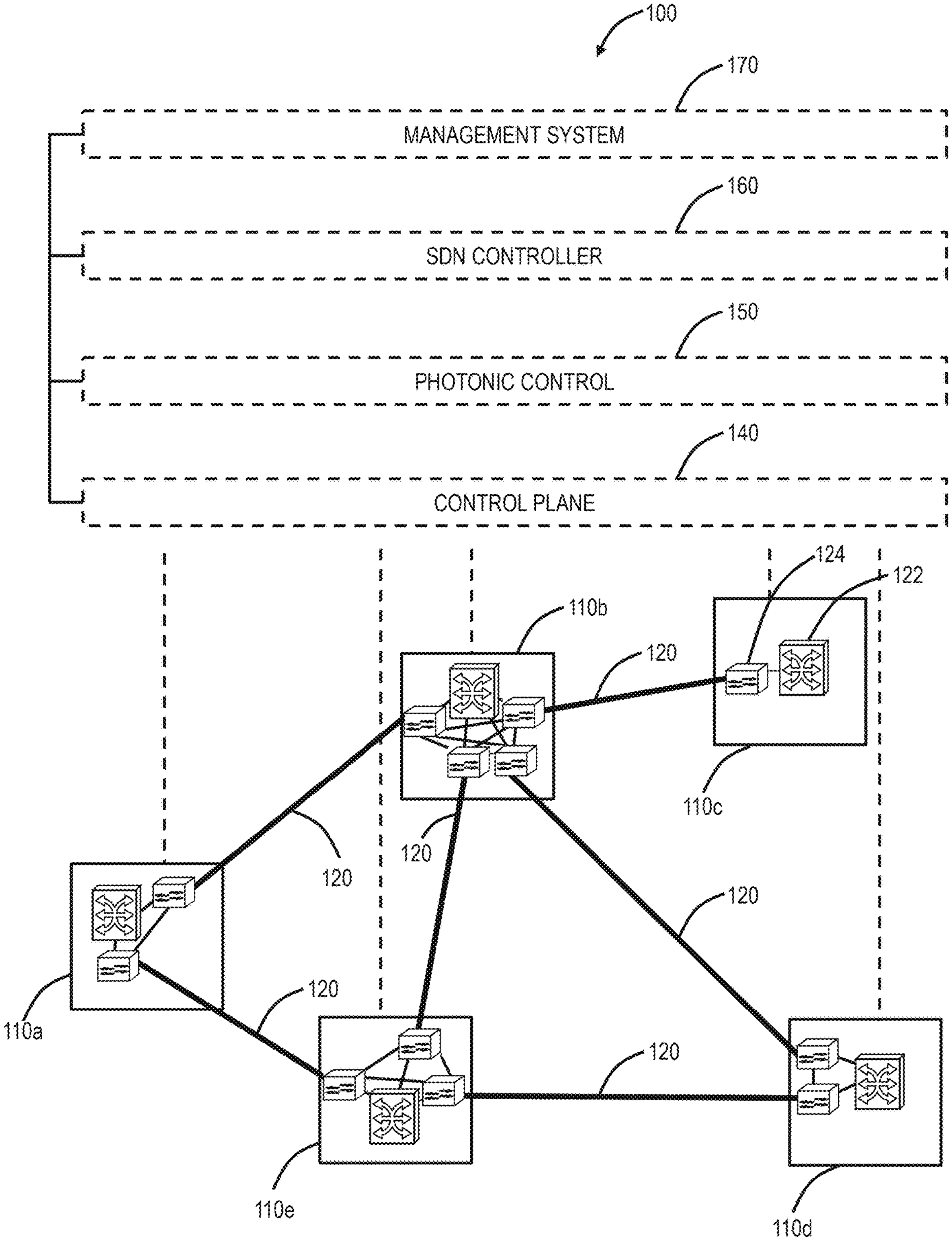
FIG. 1 illustrates an example optical network.

FIG. 1 illustrates an example optical network 100 including five interconnected sites: 110*a*, 110*b*, 110*c*, 110*d*, and 110*e*. These sites are connected via multiple fiber links 120. Each site 110 includes a switch 122 and one or more wavelength division multiplexing (WDM) network elements 124. The switch 122 supports services at Layer 1 (e.g., optical transport network (OTN)), Layer 2 (e.g., Ethernet, multiprotocol label switching (MPLS)), and Layer 3 (e.g., Internet protocol (IP)), where it may function as a router. The WDM network elements 124 handle the photonic layer (Layer 0) and perform tasks such as multiplexing, amplification, optical routing, wavelength conversion/regeneration, and local add/drop, including photonic control. Although depicted separately, the switch 122 and the WDM network elements 124 can be integrated into a single network element. For instance, a switch 122 might use pluggable transceivers that provide WDM functionality. The photonic layer may also include intermediate amplifiers and regenerators on the links 120, not shown in the diagram for simplicity. The network 100, shown as an interconnected mesh network, can adopt other architectures, include additional sites 110 or fewer sites, and incorporate various network elements and hardware. The sites 110 communicate optically over the links 120, which are examples of optical multiplex sections (OMSs).

In an embodiment, the network 100 features a control plane 140 operating across the switches 122 and/or the WDM network elements 124 at the sites 110*a* through 110*e*. The control plane 140 include software, processes, algorithms, and other elements that manage configurable features of the network 100. These features include automating the discovery of switches 122 and/or network elements 124, determining the capacity of links 120, checking port availability, ensuring connectivity between ports, disseminating topology and bandwidth information, calculating and establishing paths for connections, and providing network-level protection and restoration. The control plane 140 can utilize various control plane types for managing the switches 122 and/or network elements 124 and setting up connections.

The network 100 also includes photonic control 150, a control algorithm/loop for managing wavelengths and optical spectrum from a physical perspective at Layer 0. Photonic control 150 adds or removes wavelengths/spectrum from the links 120 in a controlled manner to minimize impacts on existing, in-service wavelengths. It can adjust modem launch powers, optical amplifier gain, variable optical attenuator (VOA) settings, WSS parameters, and more. The photonic control 150 can also optimize network performance on the links 120, including re-optimization when necessary. It can adjust the modulation format, baud rate, frequency, wavelength, spectral width of optical modems, and other components at the photonic layer. Additionally, photonic control 150 supports capacity mining by adjusting physical parameters to increase capacity without additional hardware. Controllers for the control plane 140 and photonic control 150 can be centralized, distributed, or embedded in network elements. The optical network technology is fundamentally analog and is subject to various linear and non-linear impairments on the links 120.

In an embodiment, the network 100 includes a software-defined networking (SDN) controller 160, which manages network services by abstracting lower-level functionality. It decouples the decision-making system for traffic routing (SDN control) from the physical systems forwarding traffic (optical network equipment). The SDN controller 160 allows centralized programming of forwarding decisions for flexible and precise network resource control, supporting new services. It has a global view of the optical network 100 and can connect to SDN applications using its data for various purposes.

The network 100 also includes a management system 170 that supports operations, administration, maintenance, and provisioning (OAM&P) functions for the optical network 100. Known as a network management system (NMS), an element management system (EMS), or a craft interface (CI), it can connect directly to switches 122 and/or network elements 124, as well as through the control plane 140, photonic control 150, SDN controller 160, and others. The management system 170 can provide a graphical user interface (GUI) for visualizing network functions.

Components of the Optical Network and Noise Contributions

Generally, the optical network 100 is realized at the optical level with components such as multiplexers, demultiplexers, optical amplifiers, WSSs, modems, and the like, many of which add noise impairments. Noise impairments can be introduced at various stages primarily due to amplifying or nonlinear mediums, but for generality, we can qualify all signal distortions as effective SNR degradations, thus yielding all optical components within the path as potential sources of SNR degradation. These components, essential for signal routing and amplification, can degrade the overall signal quality through crosstalk, insertion loss, ASE, filter imprecision, and the like. Managing and mitigating these noise sources is crucial for maintaining high-performance optical networks.

Currently, no solutions directly indicate which components of the optical infrastructure contribute most to service degradation and their impact level. That is, there are no known solutions to help operators understand how end-to-end optical service performance relates to the performance of individual OMS, modem, multiplexers/demultiplexers components as it is operating and potentially varying over time. Assessing the positive or negative impact of each piece of infrastructure currently requires significant optical expertise and manual analysis. With existing tools, operators can calculate the signal-to-noise ratio (SNR) margin for an optical service and receive alarms when the optical signal falls below degradation thresholds. While these indicators reflect the service's health, they do not help operators identify which parts of the infrastructure are causing issues or what the root causes are. This complicates and lengthens the troubleshooting process, requiring operators to manually inspect each part of the path and know which tools to use for each type of infrastructure (e.g., optical time domain reflectometer (OTDR) measurements for fiber spans, correlating gain settings with power achieved to expected noise figure on amplifiers, etc.). Without baseline data, it is also difficult for operators to determine if the infrastructure is genuinely problematic.

The present disclosure contemplates various techniques for measuring, calculating, simulating, and/or determining noise contributions for different components. In an embodiment, an approach is described in U.S. patent application Ser. No. 17/914,856, filed Jul. 1, 2021, and entitled "Utilizing an incremental noise metric for rapid modeling of optical networks," the contents of which are incorporated by reference in their entirety.

Solution Overview

FIGS. 2-12 are screenshots of a network monitoring system depicting the approach to quantifying and visualizing system impairments in the optical network 100. In an embodiment, the network monitoring system is part of the control plane 140, the photonic control 150, the SDN controller 160, the management system 170, or the like. In another embodiment, the network monitoring system is separate, but in communication with the aforementioned items, such as a standalone application, a cloud application, a planning system, etc. The screenshots are presented to a user, e.g., a network operator, technician, Network Operations Center (NOC) personnel, etc. for the purposes of managing and troubleshooting the optical network 100.

Figure 2:
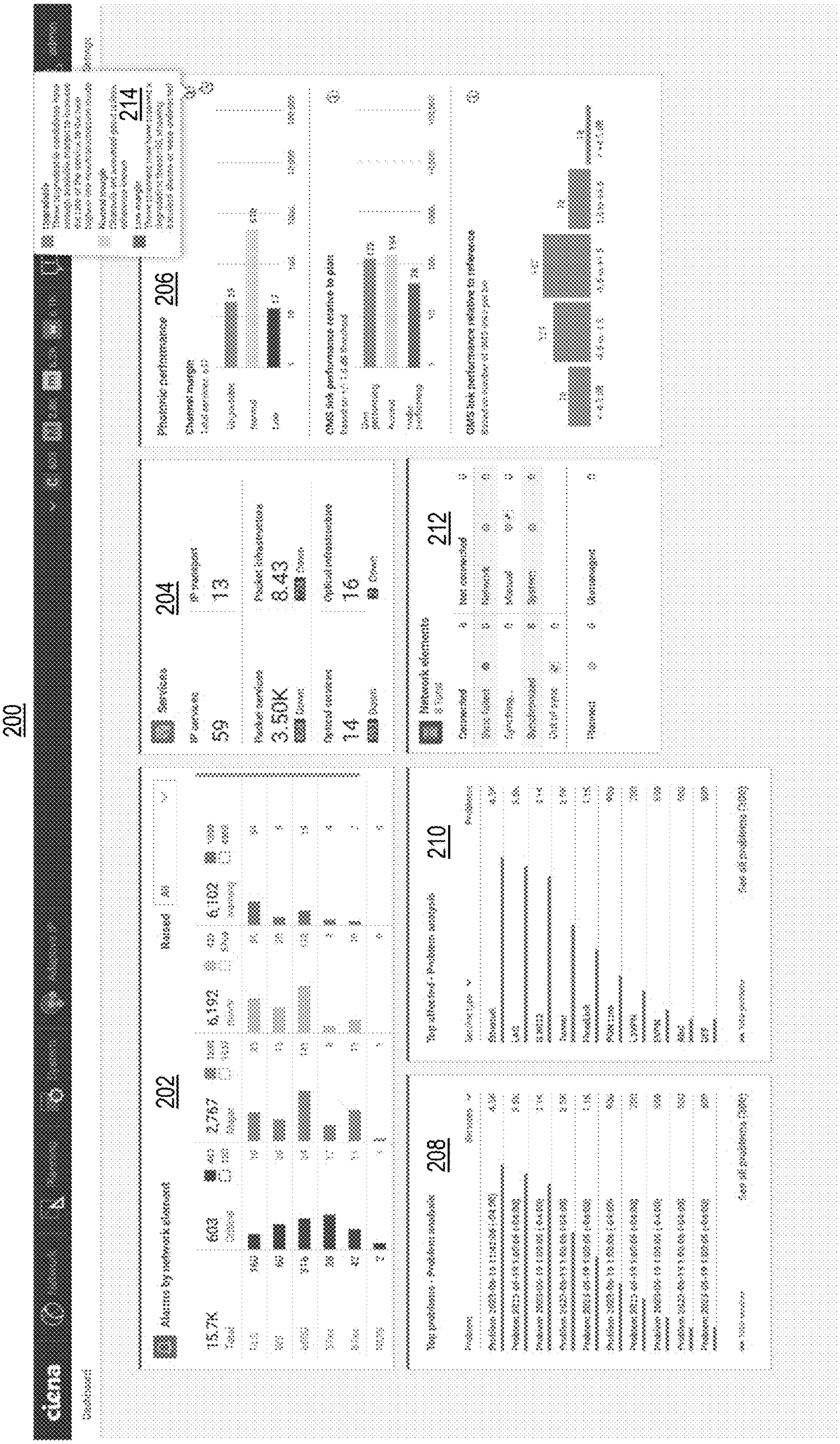
FIGS. 2 and 3 illustrate a base dashboard in a network monitoring system.
Figure 3:
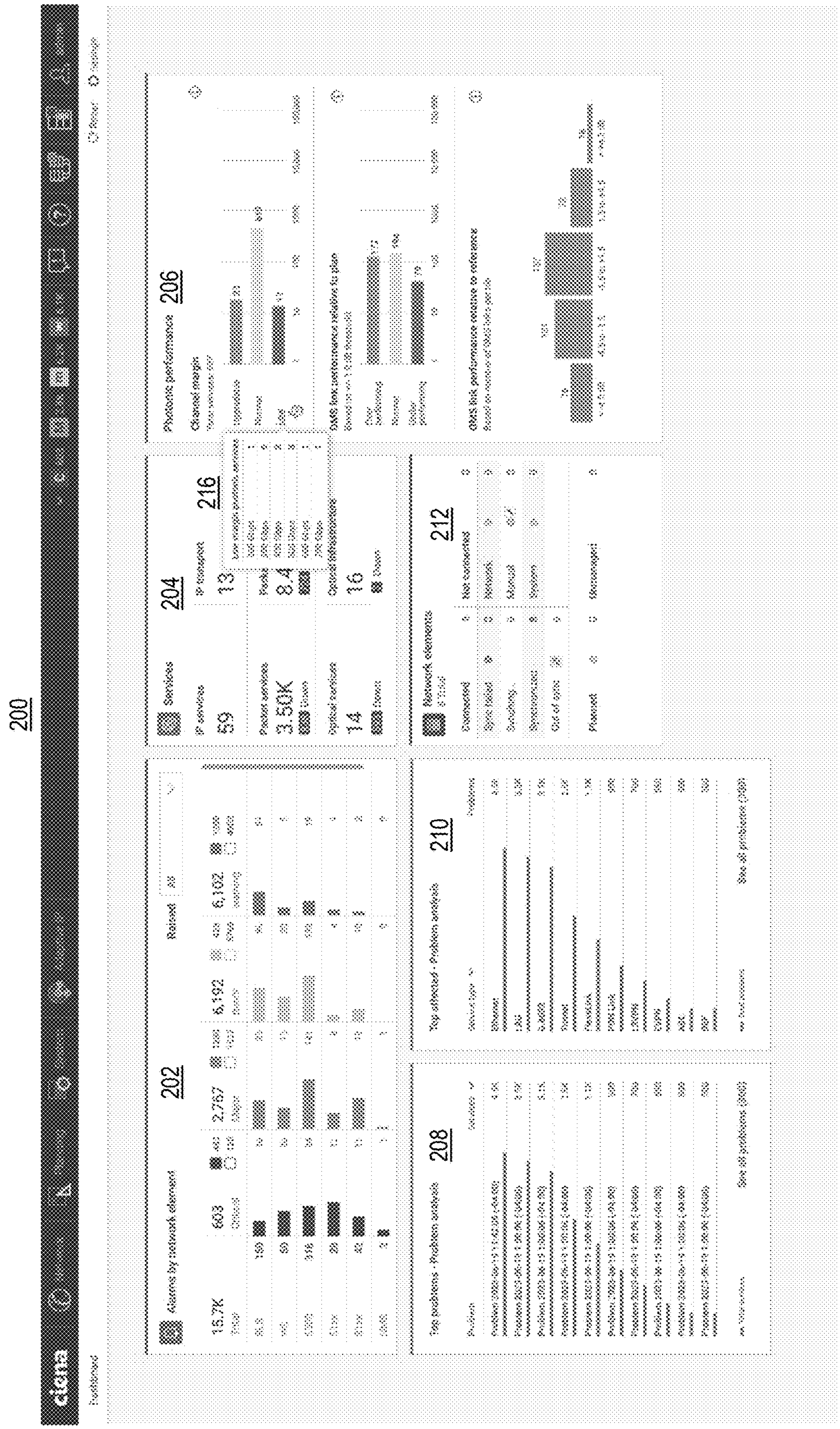

FIGS. 2 and 3 illustrate a base dashboard 200 in the network monitoring system. The dashboard 200 includes various tiles 202-212, including:

(1) an alarm tile 202 listing a visualization of the current alarms in the network 100, e.g., critical, major, minor, and warning alarms.

(2) a services tile 204 providing statistics on services in the network, e.g., IP services, IP transport, etc.

(3) a photonic performance tile 206 illustrating channel margin for services in the network 100 and OMS link performance. The channel margin visualizes the SNR margin for services showing which services are upgradable meaning they can support higher capacity, normal meaning they have sufficient and/or expected margin, or low meaning they are below some degraded threshold. In FIG. 2, a pop-up 214 is shown based on a selection over the photonic performance tile 206. The pop-up 214 explains upgradable, normal, and low. In FIG. 3, a pop-up 216 is shown based on a selection of the low margin, showing a table of low margin services.

(4) a top problems list 208 illustrating problems in an order of impact on services.

(5) a top affected list 210 illustrating services in an order of problems.

(6) a network elements tile 212 illustrating connectivity status to the network elements 124 in the network 100.

Figure 4:
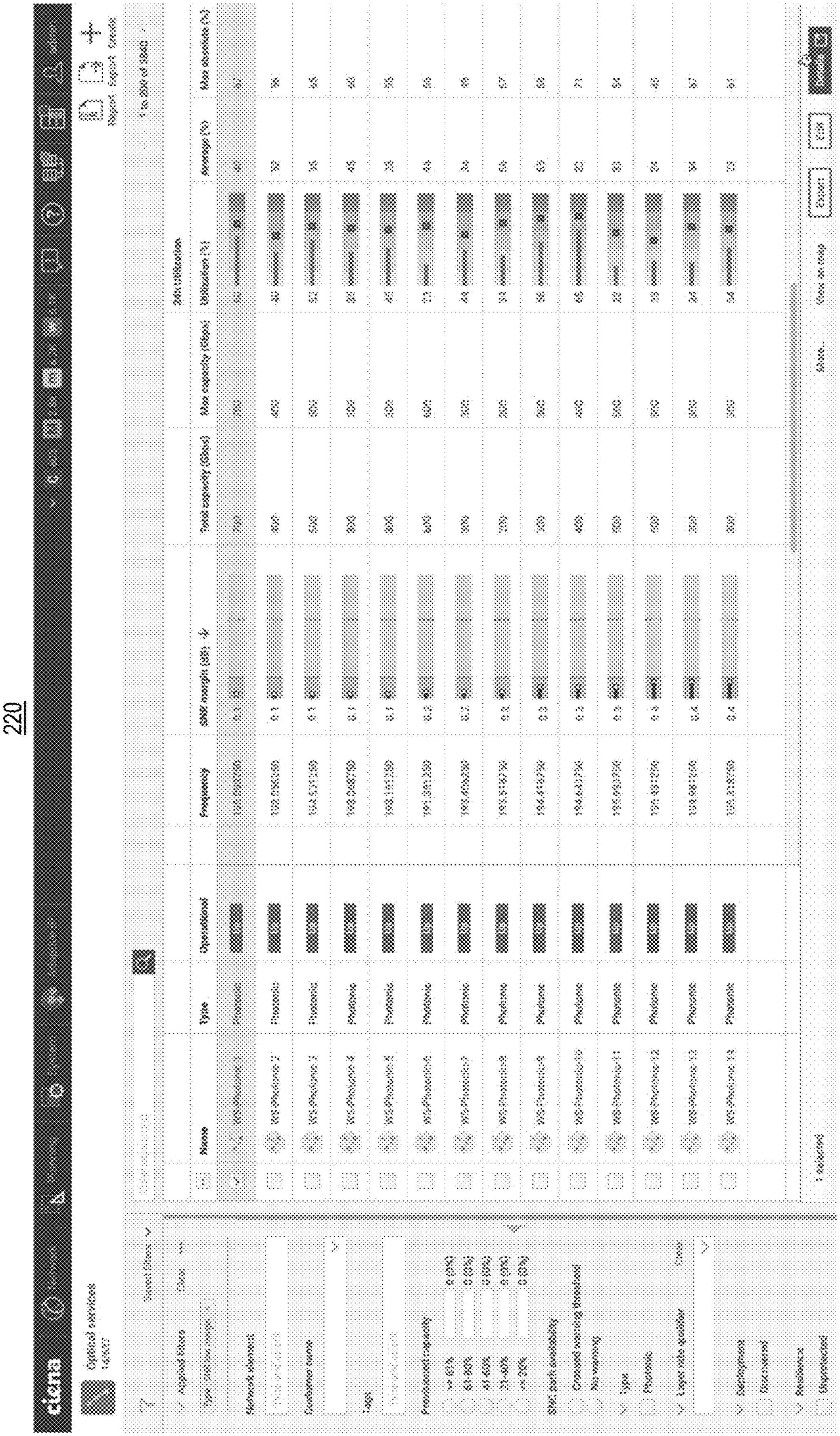
FIGS. 4 and 5 illustrate a services dashboard listing additional details of the low margin services in FIG. 3.
Figure 5:
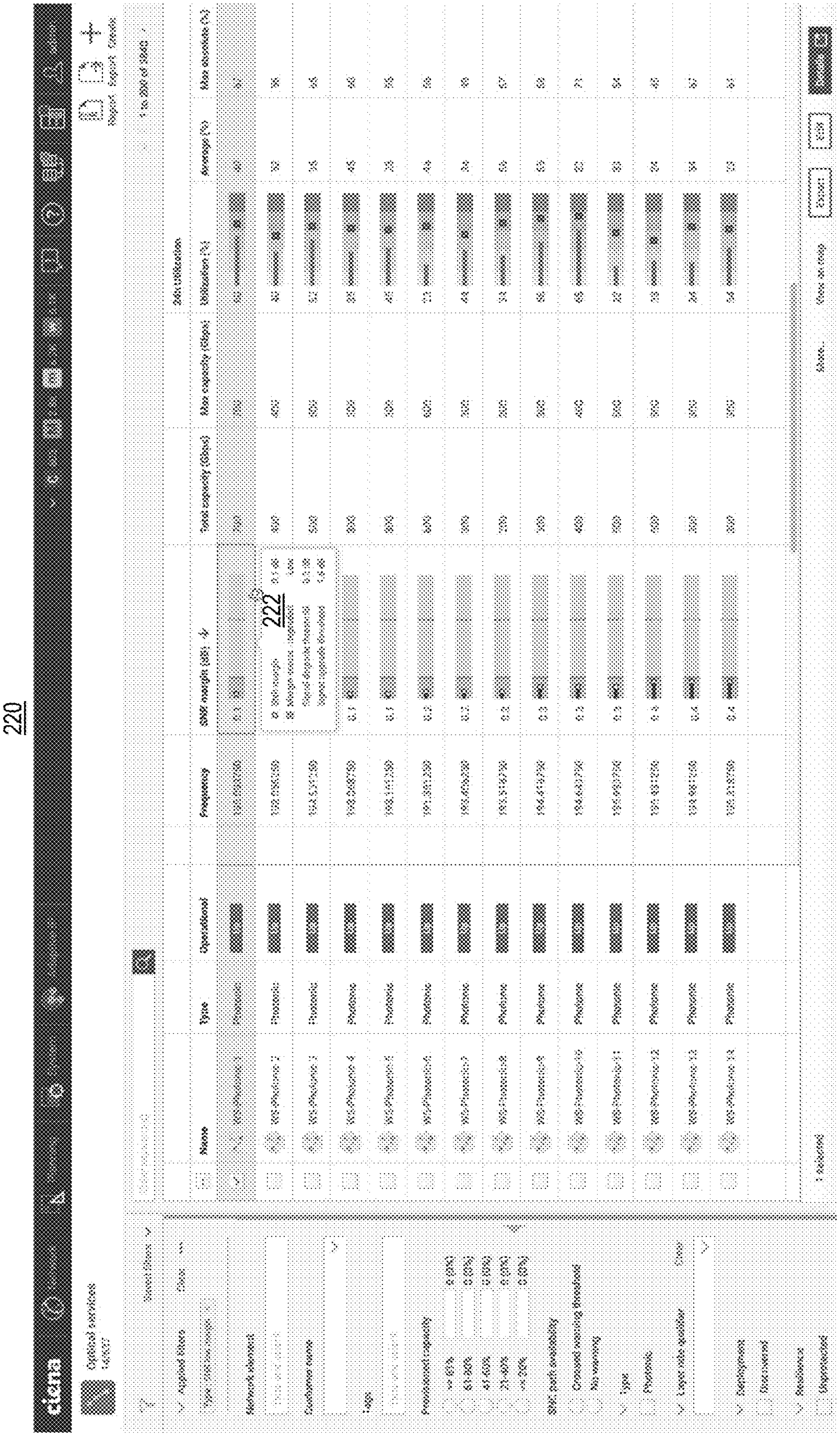

FIGS. 4 and 5 illustrate a services dashboard 220 listing additional details of the low margin services (FIG. 3). In the network 100, there can be monitoring of modem performance to quantify the SNR margin available to photonic services. As described herein, a photonic service is an optical channel, formed between two modems and traversing one or more links 120 in the optical network. In FIG. 4, the additional details can include name of the service, type (all photonic), operational state, frequency (i.e., channel or spectrum location), SNR margin in dB, capacity (total and maximum), utilization details, and other various information about the photonic services. In FIG. 5, a first service is selected, and additional details are provided for its SNR margin in a pop-up 222.

Photonic Service Dashboard

FIGS. 6-12 illustrate a photonic service dashboard 300 for the first service with low margin in FIG. 5. This service is an Optical Data Unit Container-n, where n=7, i.e., ODU7, which is a 700 Gbps service. The photonic service dashboard 300 includes a geographical map 302 showing the service terminating at ROADMs in Tampa and Miami, as well as intermediate fiber spans, amplifiers, and pass-through ROADM sites. The photonic service includes a modem 310 at Tampa and is added via a ROADM (referred to as a reconfigurable line system (RLS)) 312 at Tampa. Next, the photonic service expresses through a ROADM as Lakeland, denoted as RLS 314. There are two intermediate line amplifiers 316, 318, and another express ROADM at Palm Beach, denoted as RLS 320. Finally, there is an RLS 322 and a modem 324 at Miami which is the other terminal end of the photonic service. The geographical map 302 shows the geography and the photonic service dashboard 300 also includes a so-called subway map 330 which shows the logical connections. Further, the photonic service dashboard 300 includes a topology pull down menu 340.

Up through FIG. 5, the photonic services are shown and marked those that are degraded below a signal degrade threshold, in addition to those that are above an upgrade threshold (existing). The photonic service dashboard 300 includes a visualization that breaks down the total noise along the path of the photonic service amongst all its constituent physical infrastructure elements, i.e., components. This includes determining the noise contribution of each of the optical modems in either direction, the multiplexer and demultiplexer equipment, as well as the fiber spans.

The raw noise-to-signal ratio (NSR) is then compared to baseline values to quantify the impact of each infrastructure to the overall SNR Margin in the path. Note, in some embodiments, NSR can be used instead of SNR, and those skilled in the art will appreciate these are similar performance metrics (NSR is the inverse of SNR in linear units). The photonic service dashboard 300 quantifies components, infrastructure elements, etc., i.e., physical devices and their overall impact on noise, including at different points in time, e.g., a baseline such as at installation, and a current such as now.

For instance, if the noise attributed to a given fiber has increased over the baseline (maybe due to fiber loss), its contribution to the overall SNR Margin degradation can be quantified. To enable this comparison, several different types of baselines can be designated by the operator, such as the planned values (as per planning tool), the recorded baselines at time t=0 when the service was turned-up or at another time deemed worthy of recording as a comparable baseline by the operator.

The photonic service dashboard 300 provides a graphical visualization of the NSR per physical infrastructure relative to the pre-established baseline such that operators can quickly pinpoint infrastructure requiring further investigation. This can be done for each end-to-end path in a service requiring troubleshooting. Operators can view the infrastructure in path order, sorted by SNR Margin impact, or sorted by overall noise contribution.

For each infrastructure contributing to SNR margin degradation (or conversely improvement), a list of causes is provided to help operators address the underlying issue and the measured impact associated with that cause. This allows operators to quickly prioritize where they want to make a fix in the network.

Given the nature of each cause, related tools and information are available to the operator to get to the next step quickly. For instance, running and visualizing OTDR traces for poor-performing spans in context of the service path.

Figure 6:
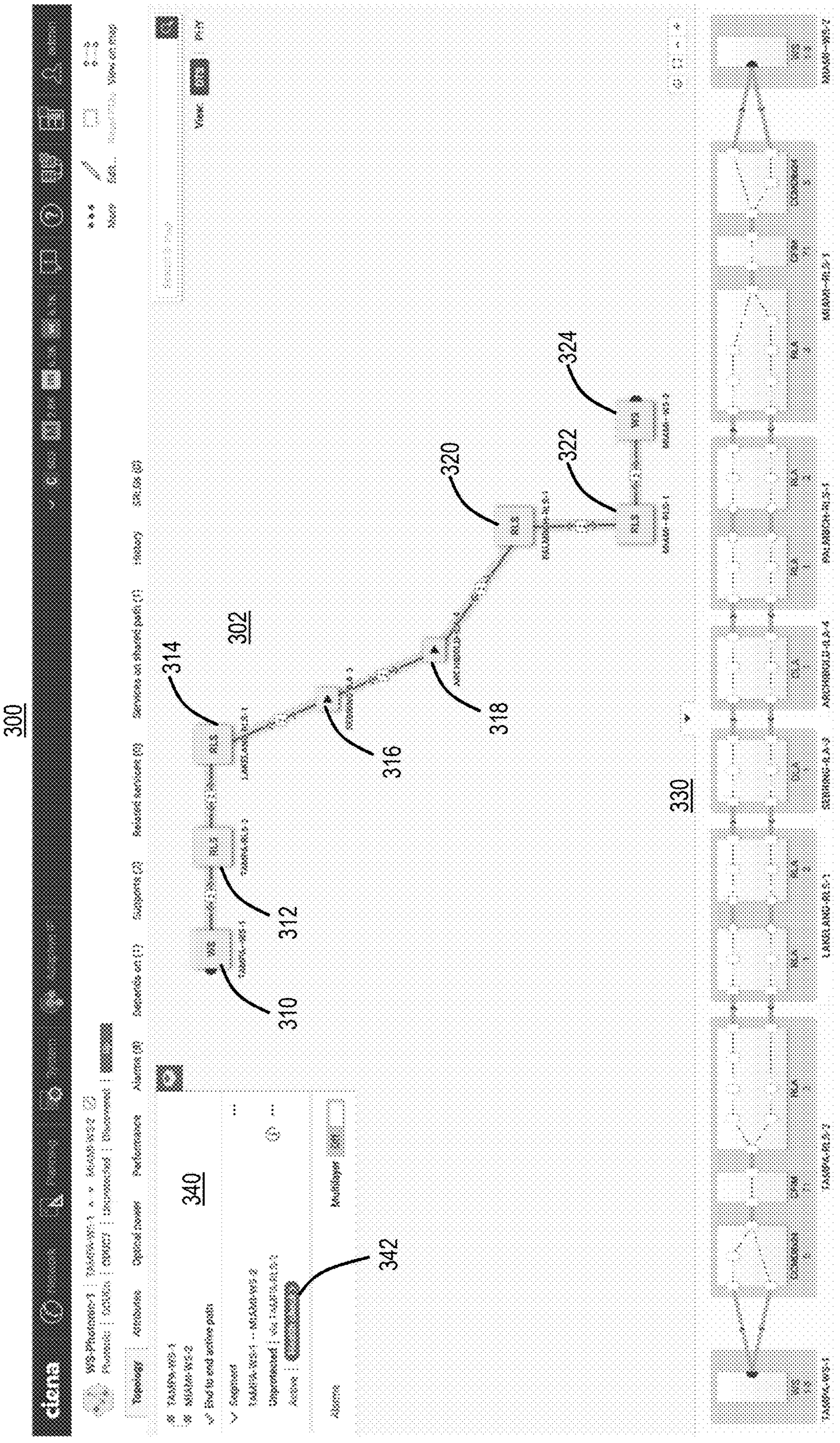
FIGS. 6-12 illustrate a photonic service dashboard for the first service with low margin in FIG. 5.

An example operation is now described with reference to FIGS. 6-12. In FIG. 6, an operator selects a health check button 342 for the photonic service. This brings up a health check visualization 350 (illustrated in detail in FIG. 7 and shown with the photonic service dashboard 300 in FIG. 8).

Figure 7:
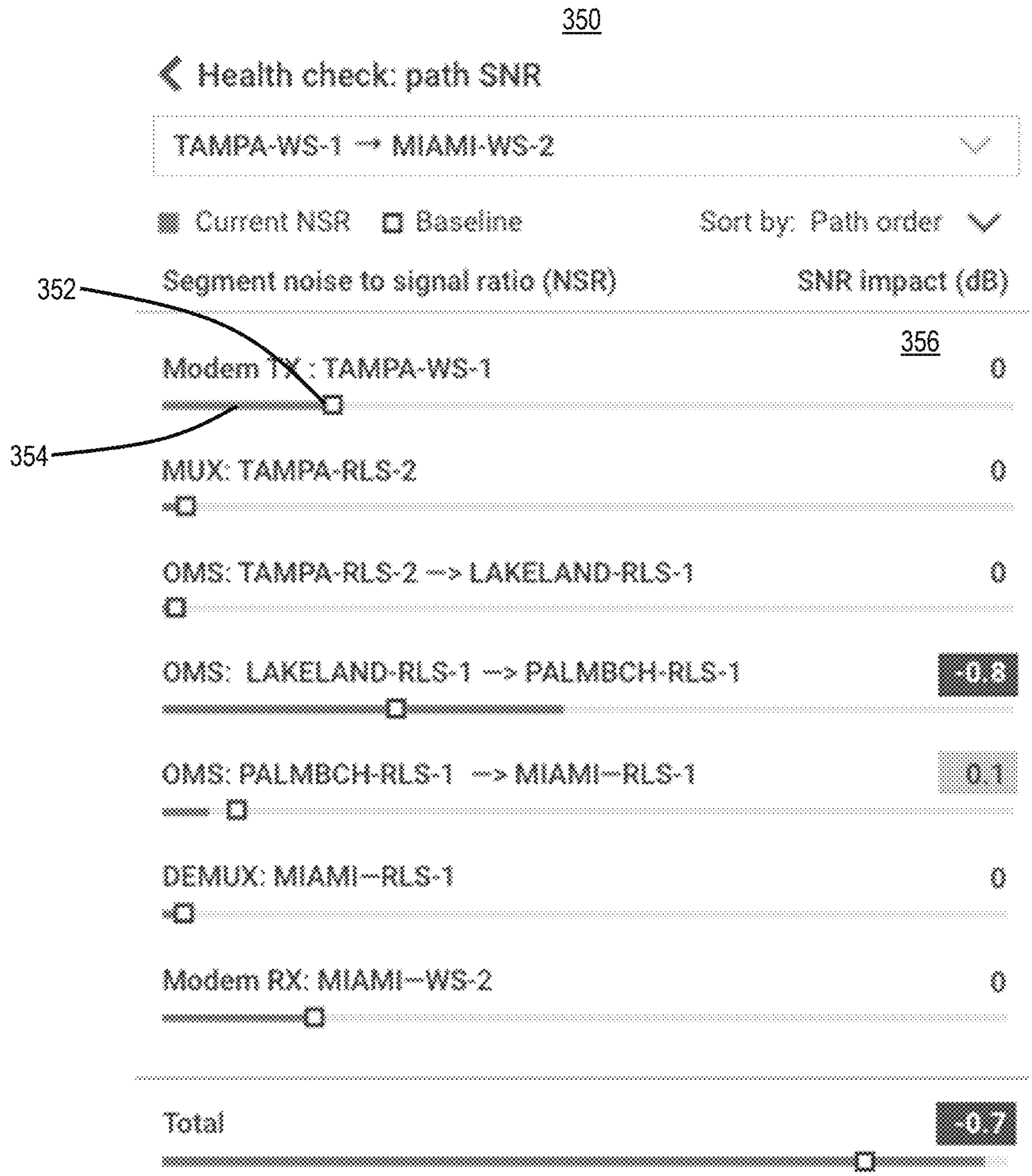
Figure 8:
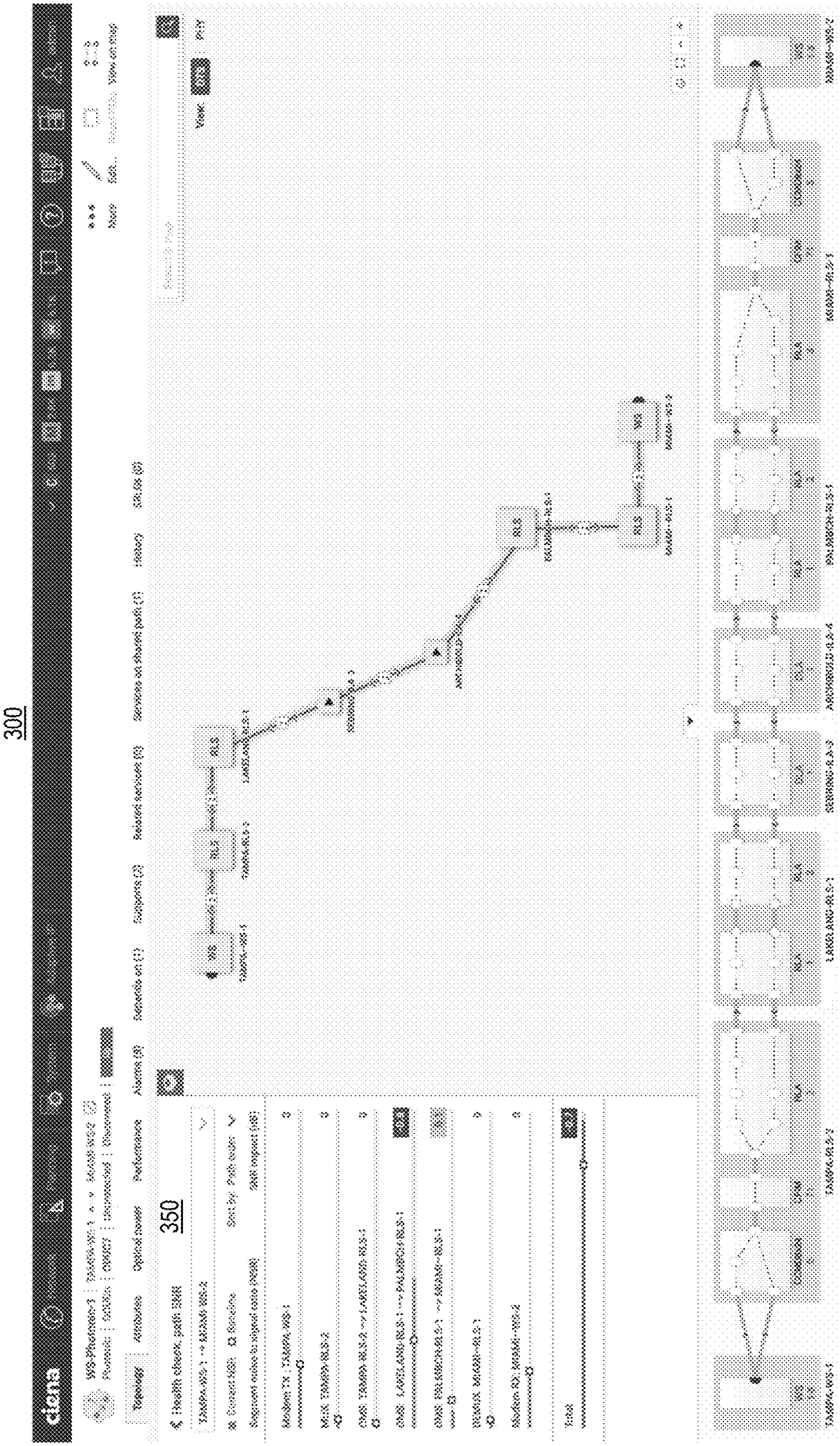
Figure 9:
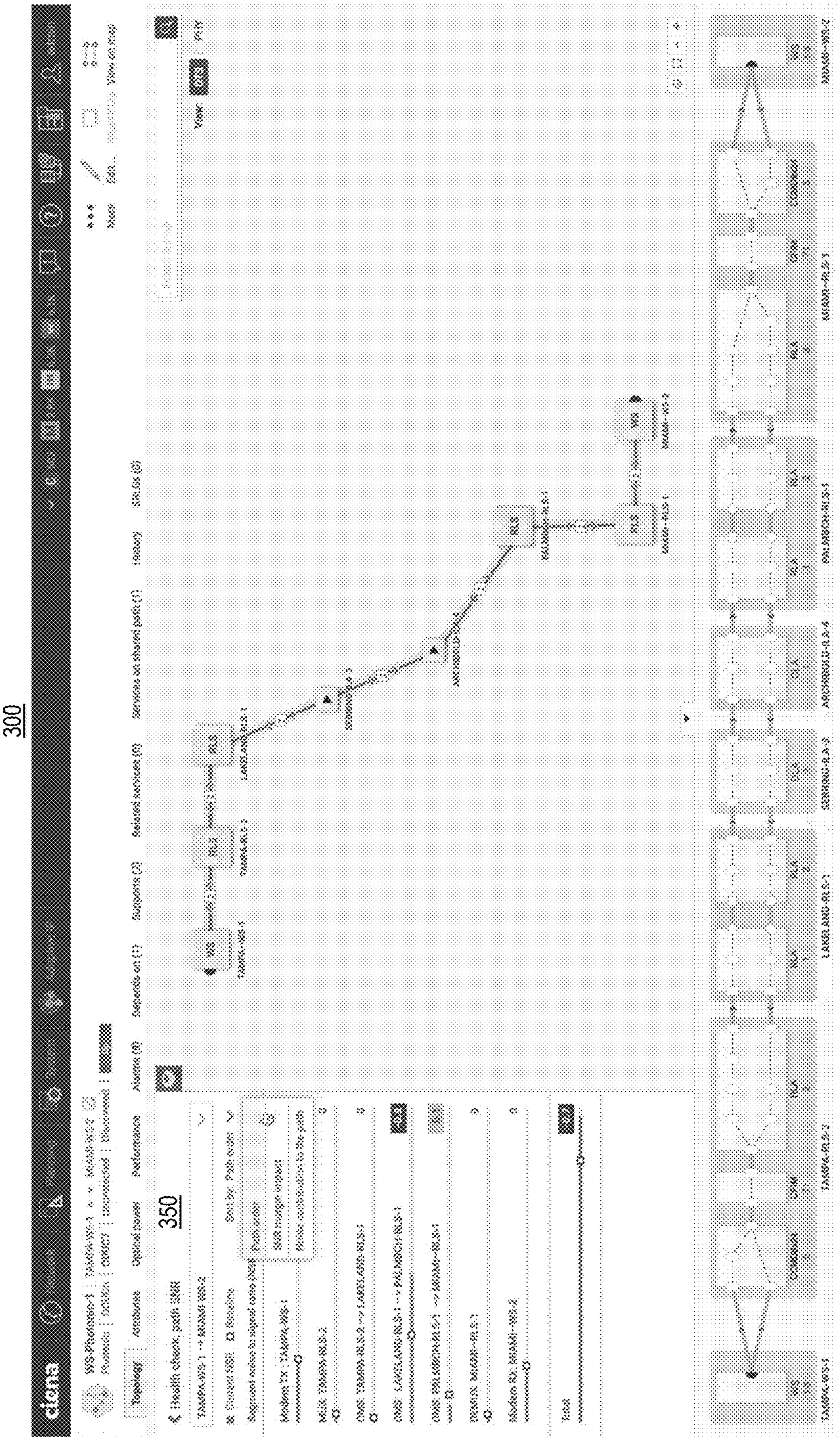

The health check visualization 350 includes an ordered listing of segments for the photonic service. In FIG. 7, the health check visualization 350 is sorted by path order, i.e., geographic order. In another embodiment, the health check visualization 350 can be sorted by worst to best or best to worst SNR (see FIG. 9 for different options). As described herein, a segment in the photonic service path is some quantifiable point or span along the path. By quantifiable, we mean something meaningful to the operator in that some technician can be sent to investigate equipment or fibers at the corresponding location. Also, the segments presented herein are for illustrative purposes and those skilled in the art will realize they can be different granularity as well as different components.

In FIG. 7, the health check visualization 350 include, in path order:

(1) a modem (Transmitter (Tx)) at Tampa, (2) a multiplexer (MUX) at Tampa, (3) an OMS between Lakeland and Palm Beach, note here we lump the entire OMS including the intermediate line amplifiers 316, 318. Of course, other granularities are possible.

(4) an OMS between Lakeland and Palm Beach, (5) an OMS between Palm Beach and Miami, (6) a demultiplexer (DEMUX) at Miami, and (7) a modem (receiver (Rx)) at Miami.

Also, of note, the path for the photonic service is unidirectional, from a Tx at Tampa to a Rx at Miami. Of course, there can be another complementary path with the same modems in the opposite direction, but that could be managed separately with the health check visualization 350, for example as shown with a drop-down menu where the complementary path could also be selected.

Now each item in the health check visualization 350 includes a line graph of NSR where the width of each line is normalized to be the amount of NSR penalty that could be tolerated before the transmission mode of the given photonic service under investigation would incur frame errors (e.g., where forward error correction would fail). The line graph is in linear units, so the NSR penalties of different components of the path can be added and compared against visually. On each line graph, there is an open box 352 showing a baseline value and a solid line 354 showing a current value. These two values are used to reflect an SNR impact 356 which is zero if the baseline value equals the current value or which is positive or negative based on a difference between the baseline value and the current value. Baseline is a previous value and can be a planning or expected value (e.g. based on simulation and/or calculation), as well as a measured value at some point after turn-up, e.g., at initial installation or some previous point in time where it was desired to take the baseline. The previous point in time can be a time when the photonic service is operating normal, with proper margin.

Figure 10:
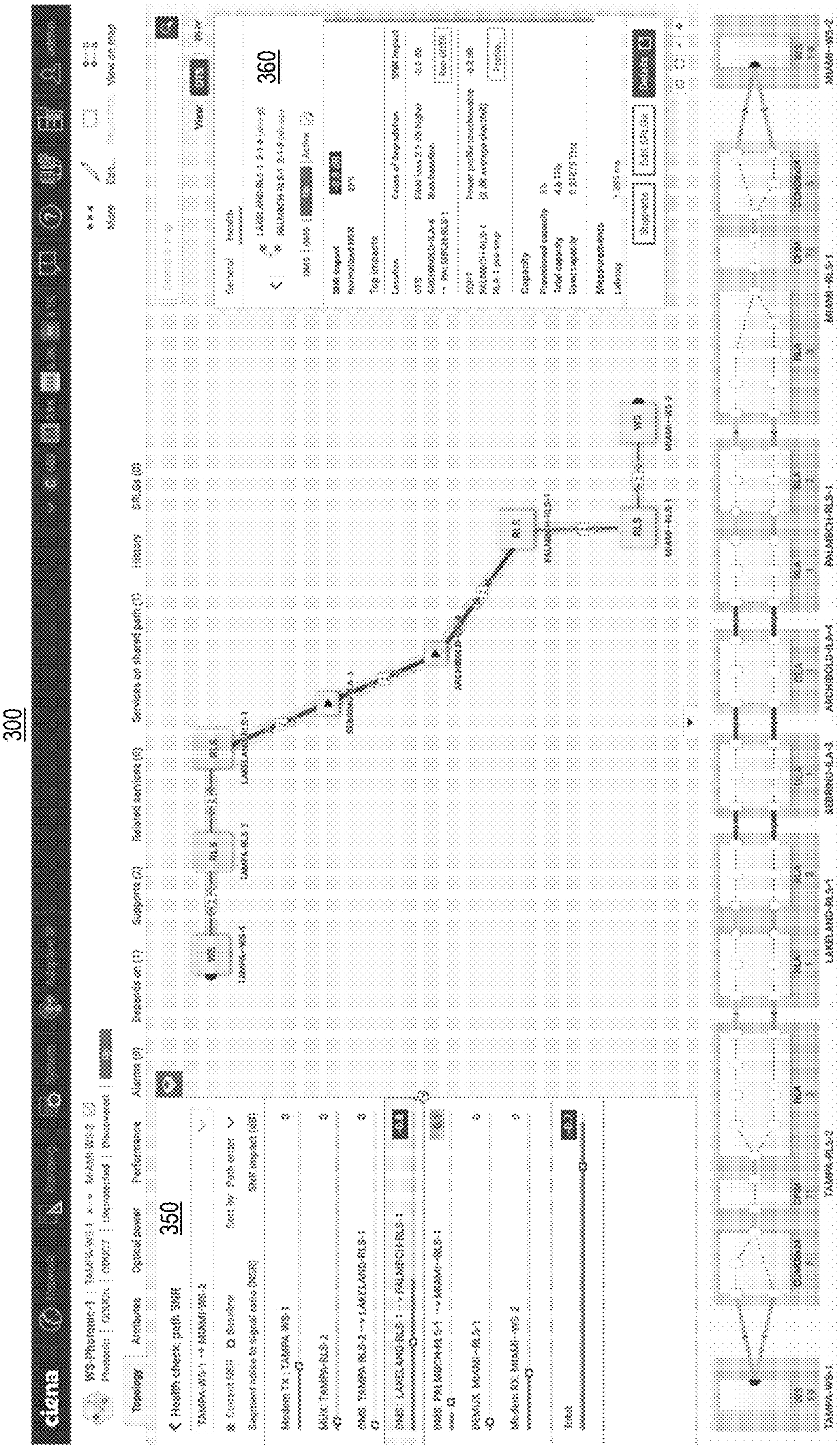
Figure 11:
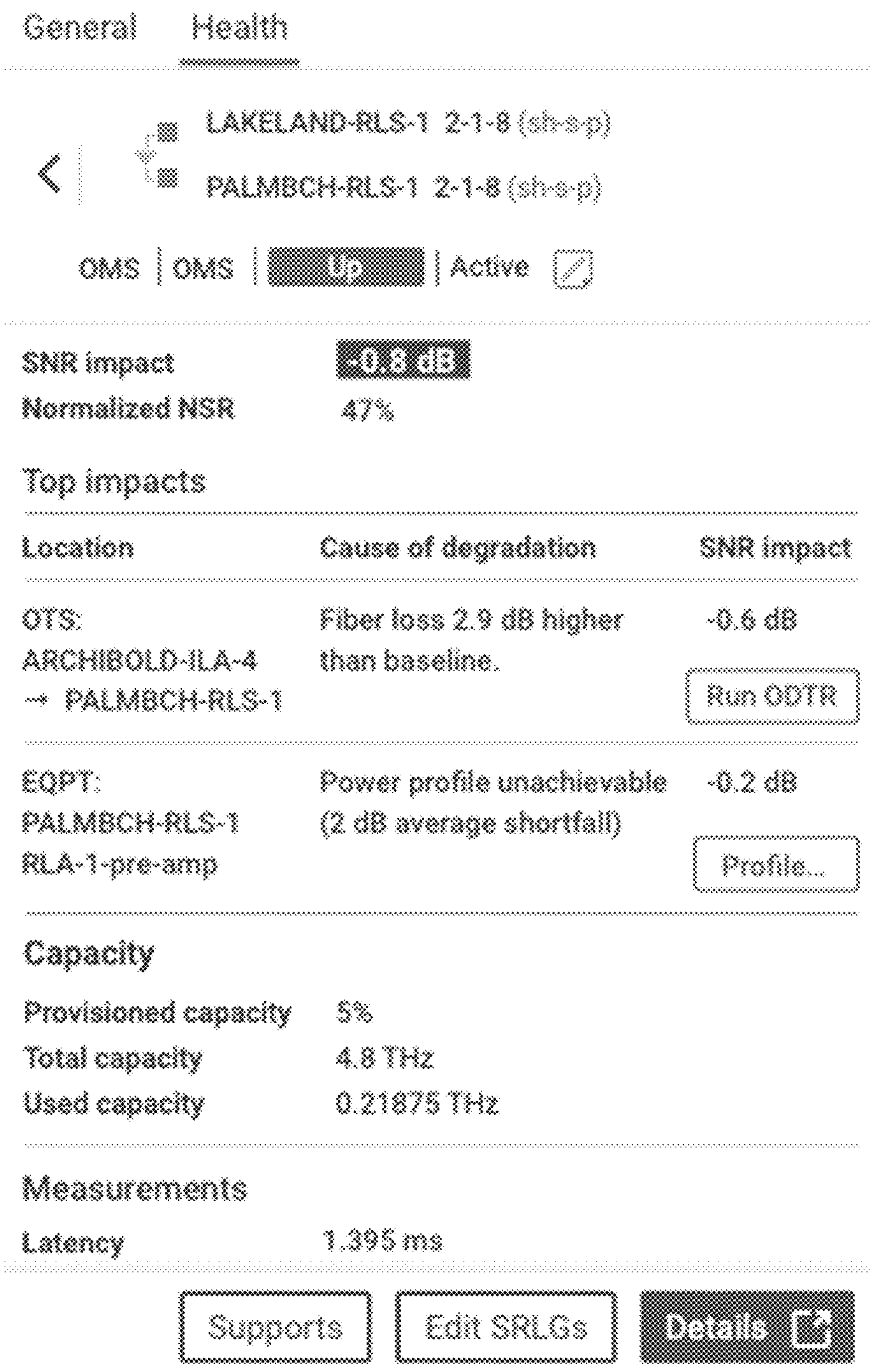

In this example, it is clear the low margin is based on the OMS between Lakeland and Palm Beach which is showing a −0.8 dB SNR impact indicating something happened within that OMS leading to a 0.8 dB degradation of the service SNR. In FIG. 10, the operator selects the OMS between Lakeland and Palm Beach in the health check visualization 350 and a health tile 360 is shown with additional details on this OMS. The health tile 360 is shown in FIG. 11. The health tile 360 lists different components and their contributions to the delta in SNR between baseline in current, along with a location, cause of degradation, value of the SNR impact, and some tools for troubleshooting.

Here, there is excess fiber loss on a particular span (2.9 dB higher than the baseline) leading to most of the SNR impact (−0.6 dB) and a suggestion to run an OTDR trace on this span. Note, the optical network 100 can include integrated OTDR tools to enable an in-service OTDR test, e.g., using a wavelength outside of the traffic-carrying wavelengths. Also, the power profile is unachievable in a pre-amplifier with an SNR impact of −0.2 B and a suggestion to measure the profile of the amplifier.

Figure 12:
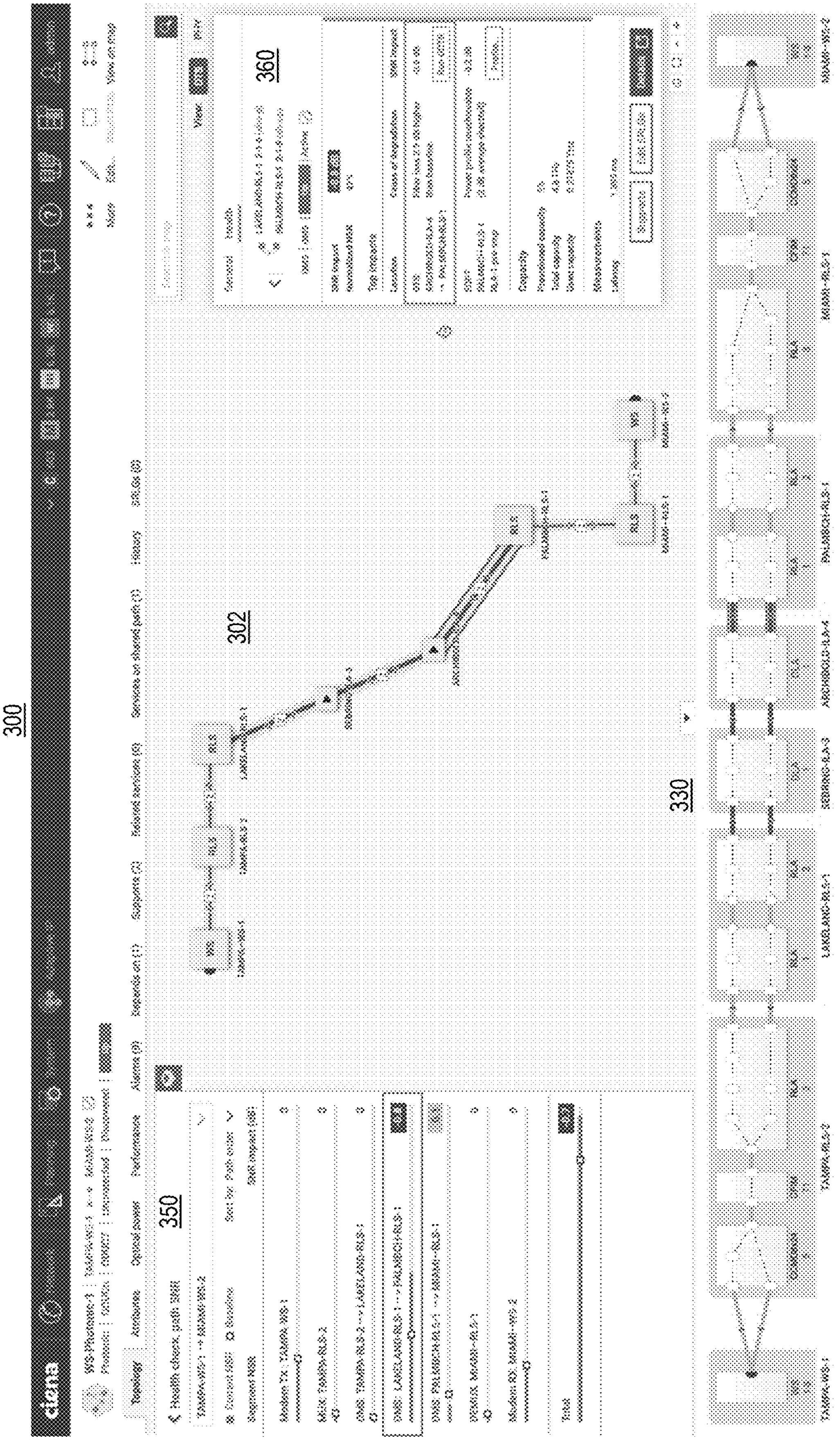

In FIG. 12, the operator selects the OMS in the health tile 360 and note this span is highlighted in the geographic map 302 and the subway map 330.

Advantageously, the photonic service dashboard 300, the health check visualization 350, and the health tile 360 provides a single pane of glass workflow which shows:

(1) the incremental penalty of segregated elements in the path of a service (e.g. breakdown how much of the noise penalty is from: transmitter, MUX ROADM, OMS1, OMS2, . . . , OMSN, DEMUX ROADM, modem receiver in linear units relative to how much noise penalty can be tolerated by that given modem; i.e., the ratio of how much NSR can be tolerated by the modem to how much NSR penalty has been consumed is the definition of how much margin the modem has available, typically expressed in dB units)—current measurement and baseline (e.g., from planning or a set baseline at time capture).

(2) This allows to see right away which parts of the network are imparting significant performance penalties on their service—currently a user has no obvious visibility of this in the context of modem performance. For each incremental element (e.g. an OMS) we quantify the SNR impact due onto the optical service relative to the baseline and provide a lower-level view of what changed (e.g. span losses, or amplifier targets) and how much those contributed to the change in performance/penalty onto the service.

(3) Contextualizing these impairments in terms of modem performance is new and is critical for prioritizing network maintenance. Today you may get an alarm at an arbitrary threshold for a loss (e.g., 3 dB loss variation) but on some spans a 3 dB loss variation has no visible service impact, whereas on others it could drop traffic—this solution provides the direct translation to pinpoint the variations that matter in terms of service impact.

Process Quantifying and Visualizing System Impairments in an Optical Network

Figure 13:
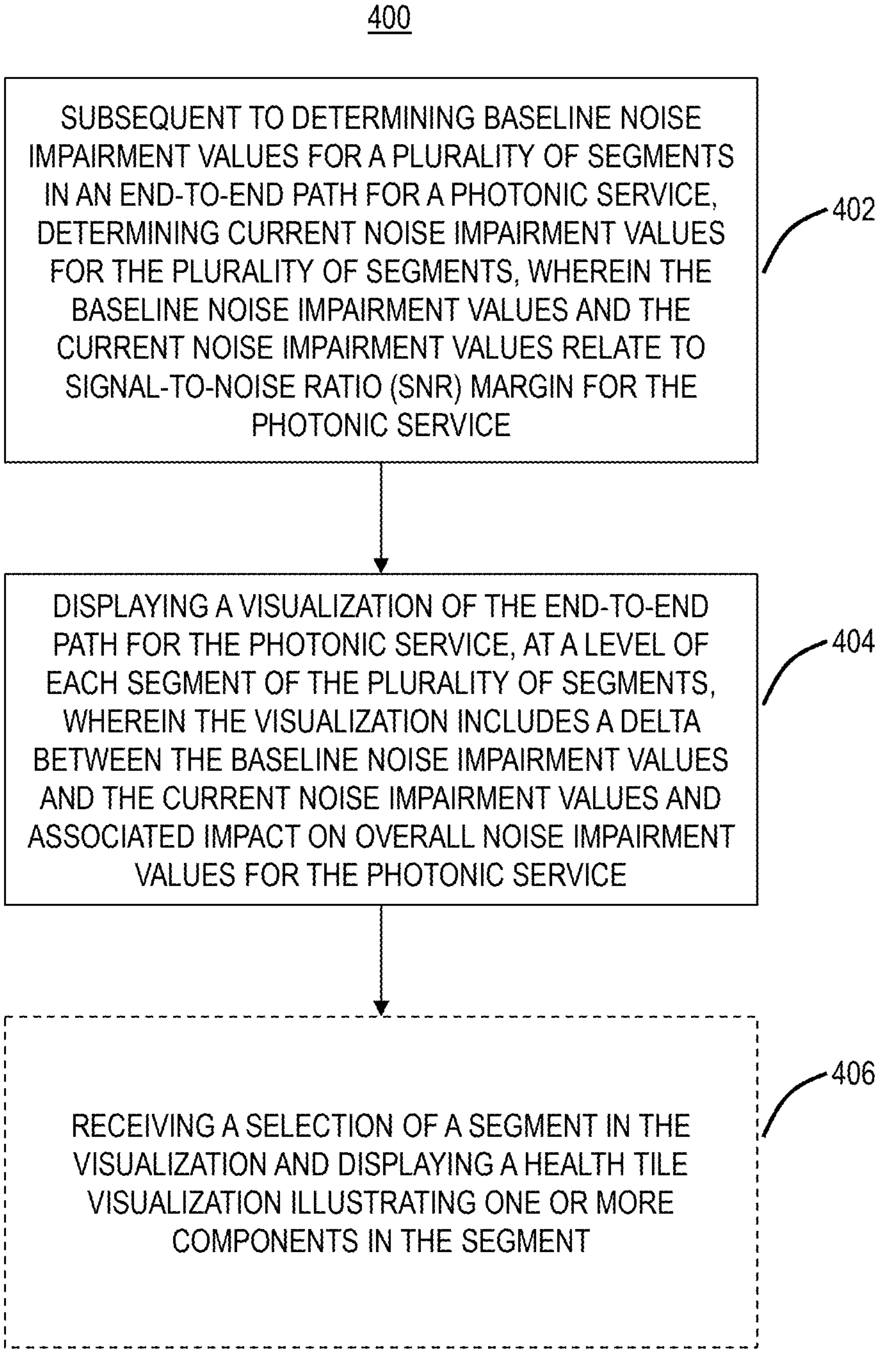
FIG. 13 illustrates a flowchart of a process quantifying and visualizing system impairments in an optical network.

FIG. 13 illustrates a flowchart of a process 400 quantifying and visualizing system impairments in an optical network. The process 400 is implemented as a method having steps, via an apparatus configured to execute the steps, and as a non-transitory computer-readable medium storing instructions that, when executed, cause one or more processors to implement the steps. The apparatus can include the computing environment 500 in FIG. 14.

The process 400 includes, subsequent to determining baseline noise impairment values for a plurality of segments in an end-to-end path for a photonic service, determining current noise impairment values for the plurality of segments, wherein the baseline noise values and the current noise values relate to Signal-to-Noise Ratio (SNR) margin for the photonic service (step 402); and displaying a visualization of the end-to-end path for the photonic service, at a level of each segment of the plurality of segments, wherein the visualization includes a delta between the baseline noise values and the current noise values and associated impact on overall noise values for the photonic service (step 404).

The process 400 can further include receiving a selection of a segment in the visualization and displaying a health tile visualization illustrating one or more components in the segment (step 406). In an embodiment, the health tile visualization includes the one or more components, their noise contribution, their location, and one or more tools for troubleshooting. In an embodiment, the one or more components include any of a modem transmitter, a multiplexer, optical amplifiers, a demultiplexer, modem receiver, and fiber. In an embodiment, the one or more components include fiber and an associated loss measurement for each of the baseline noise impairment values and the current noise impairment values.

In an embodiment, the baseline noise impairment values are determined at a previous point in time from the current noise impairment values where the photonic service was operating properly. In another embodiment, the baseline noise impairment values are determined based on a simulation or calculation.

In an embodiment, the plurality of segments include a modem transmitter, a multiplexer, at least one Optical Multiplex Section, a demultiplexer, and a modem receiver.

Computing Environment

Figure 14:
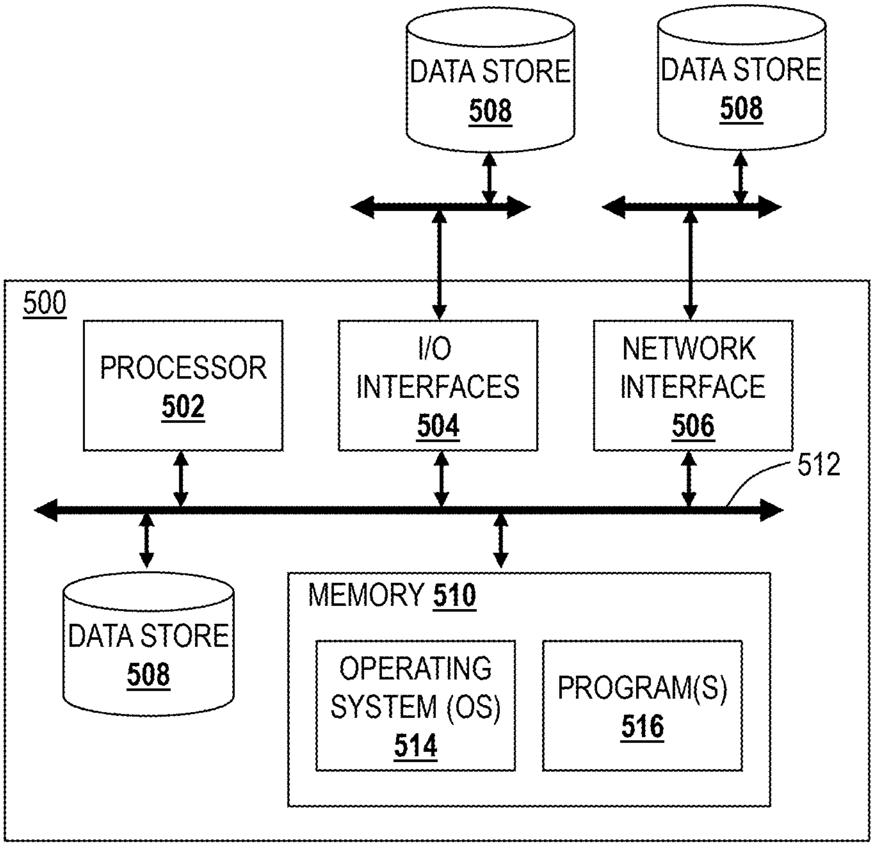
FIG. 14 illustrates a computing environment for realizing the process of FIG. 13 and the various screenshots, dashboards, tiles, and lists in FIGS. 2-12.

FIG. 14 illustrates a computing environment 500 for realizing the process of FIG. 13 and the various screenshots, dashboards, tiles, and lists in FIGS. 2-12. The computing environment 500 generally includes one or more processors 502, input/output (I/O) interfaces 504, a network interface 506, a data store 508, and memory 510. It is important to note that FIG. 14 provides an oversimplified view of the computing environment 500, and a practical embodiment may include additional components and suitably configured processing logic to support conventional operating features not detailed here. The components (502, 504, 506, 508, and 510) communicate via a local interface 512, which include one or more buses or other wired or wireless connections known in the art. The local interface 512 may also include additional elements such as controllers, buffers (caches), drivers, repeaters, and receivers to facilitate communications. Furthermore, the local interface 512 includes address, control, and/or data connections to enable appropriate communications among the aforementioned components.

The processor 502 is a hardware device designed to execute software instructions. It can be a custom-made or commercially available processor, namely any device capable of executing software instructions. When the computing environment 500 is operational, the processor 502 executes software stored in the memory 510, communicates data to and from the memory 510, and generally controls the operations of the computing environment 500 based on the software instructions. The I/O interfaces 504 are used to receive user input from and provide system output to one or more devices or components. The network interface 506 enables the computing environment 500 to communicate on a network. The network interface 506 includes address, control, and/or data connections to enable appropriate communications on the network.

The data store 508 is used to store data and includes volatile memory elements, nonvolatile memory elements, and combinations thereof. For instance, it may be an internal hard drive connected to the local interface 512 within the computing environment 500. Alternatively, the data store 508 could be an external hard drive connected to the I/O interfaces 504 or a network-attached file server. The memory 510 includes volatile memory elements, nonvolatile memory elements, and combinations thereof. The data store 508 and memory 510 incorporate electronic, magnetic, optical, and/or other types of storage media. The memory 510 may have a distributed architecture, with components situated remotely but accessible by the processor 502. The software in memory 510 includes one or more programs, each containing an ordered list of executable instructions for implementing logical functions. The memory 510 includes a suitable Operating System (O/S) 514 and one or more programs 516. The operating system 514 controls the execution of other computer programs, such as the one or more programs 516, and provides scheduling, input-output control, file and data management, memory management, communication control, and related services. The one or more programs 516 may implement the various processes, algorithms, methods, techniques, etc., described herein.

In some embodiments, the computing environment 500 is a cloud system. Cloud computing systems and methods abstract away physical servers, storage, and networking, offering these as on-demand and elastic resources. The National Institute of Standards and Technology (NIST) defines cloud computing as a model for enabling convenient, on-demand network access to a shared pool of configurable computing resources (e.g., networks, servers, storage, applications, and services) that can be rapidly provisioned and released with minimal management effort or service provider interaction. The phrase "Software as a Service" (SaaS) is often used to describe application programs offered through cloud computing. The term "the cloud" is commonly used as shorthand for a provided cloud computing service or an aggregation of all existing cloud services. In other embodiments, the computing environment 500 is the control plane 140, the photonic control 150, the SDN controller 160, the management system 170, or the like.

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

Conclusion

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments. Also, in the claims, the terms "comprise," "comprises," "comprising," "include," "includes," and "including" are intended to be non-limiting and open-ended. These terms specifically list essential elements or steps but do not exclude additional elements or steps. This applies even when a claim or series of claims includes more than one of these terms.

What is claimed is:

1. A non-transitory computer-readable medium stores instructions that, when executed by one or more processors, cause the one or more processors to perform steps of:

subsequent to determining baseline noise impairment values for a plurality of segments in an end-to-end path for a photonic service, determining current noise impairment values for the plurality of segments, wherein the baseline noise impairment values and the current noise impairment values relate to a Signal-to-Noise Ratio (SNR) margin for the photonic service;

determining, for each segment of the plurality of segments, a delta between the baseline noise impairment value and the current noise impairment value for the segment;

determining, for each segment of the plurality of segments, a per-segment contribution to an overall path noise impairment value for the photonic service, wherein the per-segment contribution is computed based on a concatenation of incremental noise-to-signal ratios across the plurality of segments along the end-to-end path, such that, for a given magnitude of the delta, the per-segment contribution differs among the plurality of segments based on respective positions of the segments along the end-to-end path; and displaying a single visualization of the end-to-end path for the photonic service, that, at a level of each segment of the plurality of segments, includes a delta for the segment and the per-segment contribution for the segment.

2. The non-transitory computer-readable medium of claim 1, wherein the steps further include receiving a selection of a segment in the visualization and displaying a health tile visualization illustrating one or more components in the segment.

3. The non-transitory computer-readable medium of claim 2, wherein the health tile visualization includes the one or more components, their noise impairment contribution, their location, and one or more tools for troubleshooting.

4. The non-transitory computer-readable medium of claim 2, wherein the one or more components include any of a modem transmitter, a multiplexer, optical amplifiers, a demultiplexer, modem receiver, and fiber.

5. The non-transitory computer-readable medium of claim 2, wherein the one or more components include fiber and an associated loss measurement for each of the baseline noise values and the current noise values.

6. The non-transitory computer-readable medium of claim 1, wherein the baseline noise impairment values are determined at a previous point in time from the current noise values where the photonic service was operating properly.

7. The non-transitory computer-readable medium of claim 1, wherein the baseline noise impairment values are determined based on a simulation or calculation.

8. The non-transitory computer-readable medium of claim 1, wherein the plurality of segments include a modem transmitter, a multiplexer, at least one Optical Multiplex Section, a demultiplexer, and a modem receiver.

9. A method comprising steps of:

subsequent to determining baseline noise impairment values for a plurality of segments in an end-to-end path for a photonic service, determining current noise impairment values for the plurality of segments, wherein the baseline noise impairment values and the current noise impairment values relate to a Signal-to-Noise Ratio (SNR) margin for the photonic service;

determining, for each segment of the plurality of segments, a delta between the baseline noise impairment value and the current noise impairment value for the segment;

determining, for each segment of the plurality of segments, a per-segment contribution to an overall path noise impairment value for the photonic service, wherein the per-segment contribution is computed based on a concatenation of incremental noise-to-signal ratios across the plurality of segments along the end-to-end path, such that, for a given magnitude of the delta, the per-segment contribution differs among the plurality of segments based on respective positions of the segments along the end-to-end path; and displaying a single visualization of the end-to-end path for the photonic service, that, at a level of each segment of the plurality of segments, includes a delta for the segment and the per-segment contribution for the segment.

10. The method of claim 9, wherein the steps further include receiving a selection of a segment in the visualization and displaying a health tile visualization illustrating one or more components in the segment.

11. The method of claim 10, wherein the health tile visualization includes the one or more components, their noise impairment contribution, their location, and one or more tools for troubleshooting.

12. The method of claim 10, wherein the one or more components include any of a modem transmitter, a multiplexer, optical amplifiers, a demultiplexer, modem receiver, and fiber.

13. The method of claim 10, wherein the one or more components include fiber and an associated loss measurement for each of the baseline noise impairment values and the current noise impairment values.

14. The method of claim 9, wherein the baseline noise impairment values are determined at a previous point in time from the current noise impairment values where the photonic service was operating properly.

15. The method of claim 9, wherein the baseline noise impairment values are determined based on a simulation or calculation.

16. The method of claim 9, wherein the plurality of segments include a modem transmitter, a multiplexer, at least one Optical Multiplex Section, a demultiplexer, and a modem receiver.

17. A computing environment comprising:

one or more processors; and memory storing instructions that, when executed, cause the one or more processors to subsequent to a determination of baseline noise impairment values for a plurality of segments in an end-to-end path for a photonic service, determine current noise impairment values for the plurality of segments, wherein the baseline noise impairment values and the current noise impairment values relate to Signal-to-Noise Ratio (SNR) margin for the photonic service, determine, for each segment of the plurality of segments, a delta between the baseline noise impairment value and the current noise impairment value for the segment;

determine, for each segment of the plurality of segments, a per-segment contribution to an overall path noise impairment value for the photonic service, wherein the per-segment contribution is computed based on a concatenation of incremental noise-to-signal ratios across the plurality of segments along the end-to-end path, such that, for a given magnitude of the delta, the per-segment contribution differs among the plurality of segments based on respective positions of the segments along the end-to-end path; and display a single visualization of the end-to-end path for the photonic service, that, at a level of each segment of the plurality of segments, includes a delta for the segment and the per-segment contribution for the segment.

18. The computing environment of claim 17, wherein the instructions that, when executed, further cause the one or more processors to receive a selection of a segment in the visualization and displaying a health tile visualization illustrating one or more components in the segment.

19. The computing environment of claim 17, wherein the baseline noise impairment values are determined one of (1) at a previous point in time from the current noise impairment values where the photonic service was operating properly and (2) based on a simulation or calculation.

20. The computing environment of claim 17, wherein the plurality of segments include a modem transmitter, a multiplexer, at least one Optical Multiplex Section, a demultiplexer, and a modem receiver.

* * * * *